(12) United States Patent
Mulcahy (10) Patent No.: US 10,983,541 B2
(45) Date of Patent: Apr. 20, 2021

(54) TEMPERATURE CONTROL SYSTEM (71) Applicant: BRITISH GAS TRADING LIMITED, Windsor (GB)

(72) Inventor: John Mulcahy, Bedford (GB)

(73) Assignee: BRITISH GAS TRADING LIMITED, Windsor (GB)

( * ) Notice: Subject to any disclaimer, the term of this patent is extended or adjusted under 35 U.S.C. 154(b) by 774 days.

(21) Appl. No.: 15/743,107

(22) PCT Filed: Jul. 8, 2016

(86) PCT No.: PCT/GB2016/052074
§ 371 (c)(1),
(2) Date: Jan. 9, 2018

(87) PCT Pub. No.: WO2017/006137
PCT Pub. Date: Jan. 12, 2017

(65) Prior Publication Data
US 2019/0072990 A1 Mar. 7, 2019

(30) Foreign Application Priority Data

Jul. 9, 2015 (GB) .................................... 1512028

(51) Int. Cl.
*G05D 23/19* (2006.01)
*F24D 19/10* (2006.01)
*F23N 5/20* (2006.01)

(52) U.S. Cl.
CPC ......... *G05D 23/1919* (2013.01); *F23N 5/203* (2013.01); *F24D 19/1009* (2013.01);
(Continued)

(58) Field of Classification Search
CPC .......... G05D 23/1919; G05D 23/1904; G05D 23/1913; G05D 23/1951; G05D 23/30;
(Continued)

(56) References Cited

U.S. PATENT DOCUMENTS

| | | | |
|---|---|---|---|
| 5,410,890 A * | 5/1995 | Arima ................ | G05B 13/0275 62/228.4 |
| 6,072,163 A | 6/2000 | Armstrong et al. | |

(Continued)

FOREIGN PATENT DOCUMENTS

| | | |
|---|---|---|
| CN | 1888998 A | 1/2007 |
| GB | 2400458 A | 10/2004 |

OTHER PUBLICATIONS

International Written Opinion from corresponding International Application No. PCT/GB2016/052074, dated Nov. 21, 2016.
(Continued)

*Primary Examiner* — Rocio Del Mar Perez-Velez
*Assistant Examiner* — Olvin Lopez Alvarez
(74) *Attorney, Agent, or Firm* — Tucker Ellis LLP; Michael G. Craig (57) ABSTRACT

A method of generating a control signal for a temperature control system is disclosed. The control signal has one of an "on" state in which the temperature control system is to be activated and an "off" state in which the temperature control system is to be deactivated. The method comprises calculating a temperature error measure in dependence on a target temperature and a current temperature value. A rate of temperature change in the environment is determined and used to set a variable error threshold. The method switches between a continuous "on" signal mode and a pulse-width-modulation (PWM) mode, in which the output signal comprises alternating "off" and "on" periods in accordance with a PWM pattern. The switch occurs in dependence on the temperature error measure and the variable error threshold.

20 Claims, 8 Drawing Sheets

(52) U.S. Cl.
CPC ..... *G05D 23/1904* (2013.01); *G05D 23/1913* (2013.01); *F23N 2225/12* (2020.01)

(58) Field of Classification Search
CPC ...... F23N 5/203; F23N 2225/12; F23N 5/022; F23N 2223/22; F23N 2237/10; F23N 2241/02; F24D 19/1009
See application file for complete search history.

(56) References Cited

U.S. PATENT DOCUMENTS

| | | |
|---|---|---|
| 8,600,561 B1 | 12/2013 | Modi et al. |
| 2005/0092317 A1 | 5/2005 | Hugghins et al. |
| 2007/0168084 A1* | 7/2007 | Cheng ................ G05D 23/1917 700/276 |
| 2008/0116180 A1* | 5/2008 | Norton .................. G05B 11/28 219/121.54 |
| 2008/0314999 A1* | 12/2008 | Strand .................. F24H 9/2007 236/20 R |
| 2009/0084771 A1* | 4/2009 | Nomura ................ G05D 23/22 219/263 |
| 2015/0144300 A1 | 5/2015 | Parker et al. |
| 2016/0054018 A1* | 2/2016 | Motodani ................ F24F 11/56 700/276 |

OTHER PUBLICATIONS

United Kingdom, UK Search Report for GB1512028.0 date of search Jan. 18, 2016, South Wales, pp. 6.
Chinese Office Action from corresponding Chinese Application No. 201680040321.1 dated Jun. 1, 2020.

\* cited by examiner

TEMPERATURE CONTROL SYSTEM

BACKGROUND

A common example of a domestic environmental heating system comprises a central heating boiler controlled by a thermostat. When the ambient temperature in the environment as measured by the thermostat is below a set target temperature, the thermostat sends a call-for-heat signal to the boiler to activate the boiler.

However, conventional designs can often be inaccurate. For example, since the call-for-heat signal is typically binary, continuous activation of the boiler occurs until the target temperature is reached. However, after the target has been attained, residual heat output of the heating system can continue to heat the environment beyond the desired target. As a result, the temperature may overshoot the target temperature set by the user.

While such inaccuracy is in itself undesirable for the user, inefficient control schemes also waste energy and thus increase fuel consumption and running costs.

The present invention seeks to alleviate certain problems associated with known control schemes.

SUMMARY

Accordingly, in a first aspect of the invention, there is provided a method (as set out in claim 1) of generating a control signal for a temperature control system, the control signal having one of an "on" state in which the temperature control system is to be activated and an "off" state in which the temperature control system is to be deactivated, the method comprising: receiving an indication of a target temperature for a temperature-controlled environment; receiving a current temperature value determined based on a measurement of a current temperature in the environment; calculating a temperature error measure in dependence on the target temperature and the current temperature value; determining a rate of temperature change in the environment; setting a variable error threshold based on the determined rate of temperature change; generating the control signal, wherein the generated control signal comprises, in a first, continuous mode, a substantially continuous "on" signal, and wherein, in a second, pulse-width-modulation (PWM) mode, the output signal comprises alternating "off" and "on" periods in accordance with a PWM pattern; and switching between the first mode and second mode in dependence on the temperature error measure and the variable error threshold.

The method may comprise generating the control signal in the continuous mode if the temperature error measure exceeds the error threshold and/or generating the control signal in the PWM mode if the temperature error measure is below the error threshold. The error measure is thus preferably calculated as a positive value where a relatively lower value indicates a small error and a relatively higher value indicates a large error. However, alternative formulations of the error measure could invert or otherwise change the way in which the error threshold is applied and such alternatives are within the scope of the invention.

The method preferably comprises generating the control signal in accordance with the first or second mode in response to determining that temperature control is required, and preferably further comprises generating the control signal in a third mode as a substantially continuous "off" signal when temperature control is not required. Whether or not temperature control is required may depend on control information or a control schedule (e.g. whether a user has configured temperature control to be active or inactive), and/or on a current temperature and currently applicable target temperature. More particularly, the method may include determining whether to perform temperature control based on the temperature error measure, preferably wherein temperature control is performed if the error measure exceeds a predefined minimum error.

The method preferably comprises calculating the rate of temperature change based on a plurality of temperature measurements. Wherever reference is made herein to temperature measurements (unless the context requires otherwise) these generally relate to measured temperatures in an environment for which temperature control is to be performed, and may be raw temperature measurements as received from a temperature sensing component, or may be pre-processed as described elsewhere herein.

The method preferably comprises performing the rate determining and threshold setting steps repeatedly (typically periodically) during operation to generate the control signal, preferably comprising using a currently applicable (e.g. the most recently set) error threshold to select the continuous or PWM mode for generating the signal. Rate determining and/or threshold setting may thus occur essentially continuously (or quasi-continuously) during normal operation with the current threshold influencing the mode selection, so that the threshold application changes dynamically with the determined rate of temperature change. The rate determining and threshold setting may be repeated at the same calculation interval or at respective different intervals.

The determining and setting steps are preferably performed (only) after the temperature control system has been continuously activated for a predetermined period of time, preferably wherein the error threshold is set to a predetermined (e.g. fixed) value prior to that time.

Preferably, the rate of temperature change is calculated (or estimated) based on a set of temperature samples corresponding to a predetermined time period. Calculating the rate of temperature change may comprise applying a curve fitting algorithm to fit a curve (e.g. a straight line) to the set of temperature samples and determining the rate of temperature change from the curve. The calculated values for the rate of temperature change may additionally be low-pass filtered.

When the determined rate of temperature change is less than a predetermined value, the method preferably comprises setting the variable error threshold to a predetermined value, optionally zero. Thus, the PWM mode is preferably not used when the determined rate of temperature change is less than the predetermined value. This prevents application of PWM delaying attainment of the target temperature when the rate of temperature change is low.

The method may further comprise selecting a PWM pattern from a plurality of predefined PWM patterns in dependence on the calculated temperature error measure, each pattern defining a sequence of pattern segments for a control signal, each segment corresponding to an "on" signal state or an "off" signal state; and generating the control signal based on the selected PWM pattern. This feature may also be provided as an independent aspect of the invention.

Accordingly, in a further aspect of the invention, there is provided a method (as set out in claim 13) of generating a control signal for a temperature control system, the control signal having one of an "on" state in which the temperature control system is to be activated and an "off" state in which the temperature control system is to be deactivated, the method comprising: storing information defining a plurality of pulse-width modulation, PWM, patterns, each pattern comprising a sequence of pattern segments for a control signal, each segment corresponding to an "on" signal state or an "off" signal state; receiving an indication of a target temperature for a temperature-controlled environment; receiving a current temperature value determined based on a measurement of a current temperature in the environment; calculating a temperature error measure in dependence on the target temperature and the current temperature value; selecting a PWM pattern in dependence on the calculated temperature error measure; and generating the control signal based on the selected PWM pattern.

The following optional features may be applied to either of the above aspects of the invention.

Each pattern segment may correspond to a predetermined (optionally but not necessarily equal) signal duration, the generating step preferably comprising generating, for each segment of the selected pattern, an "on" or "off" output signal as specified by the PWM pattern for the segment, for the segment duration.

Generating the control signal based on the selected PWM pattern preferably comprises repeatedly generating a signal with the specified pattern, preferably until the selected PWM pattern changes or until a signal generation mode change (e.g. as per the first aspect of the invention set out above).

The selecting and generating steps are preferably performed when the temperature error measure meets one or more predetermined criteria for generating the output signal in a PWM mode. The predetermined criteria may comprise one or both of: the temperature error measure meeting or exceeding a predefined minimum error, optionally zero; the temperature error measure not exceeding or being below a predefined maximum error for PWM operation. The predefined maximum error of PWM operation is preferably selected dynamically based on a calculated rate of temperature change in the environment, optionally as set out above.

Each pattern, when processed in a first sequence order (e.g. a forwards order), preferably starts with an "off" period and preferably ends with an "on" period. The generating preferably comprises applying the pattern in the first sequence order if the current measured temperature value is approaching the target temperature, wherein the first segment of the PWM pattern is defined as an "on" segment in the first sequence order. The generating may comprise applying the pattern in a second sequence order (preferably the reverse of the first sequence order) when returning to PWM signal generation after overshooting the target temperature, preferably wherein the first encountered segment of the pattern is an "on" segment in the second sequence order.

The pattern segments of each pattern may be stored as entries in a list or table row (or other linearly ordered data structure), the method comprising indexing the list or table row (or other data structure) in the first or second sequence order.

Preferably, calculating a temperature error measure comprises determining a current temperature difference between the target temperature and the current temperature value, the temperature error measure being based on the current temperature difference. Calculating the temperature error measure may comprise adding a contribution based on the current temperature difference and a contribution based on an integrator term, the integrator term preferably based on a sum of past temperature differences.

The calculating step may comprise adding the current temperature difference to the integrator term only if one or more predetermined update criteria are met. Preferably, the method may comprise updating the integrator if the temperature error (or its absolute value) is below a predetermined threshold, the predetermined threshold preferably corresponding to a threshold for a PWM signal generation mode (e.g. as per the first aspect of the invention set out above). The method may comprise not updating the integrator if the target temperature has been reduced and the measured temperature has not yet fallen below the reduced target temperature. The method may alternatively or additionally comprise (preferably following an increase in target temperature) only updating the integrator after the temperature error measure has been within a predetermined threshold for a predetermined duration, and preferably wherein the target temperature has remained constant for that duration.

The integrator value may be limited to a maximum value, the maximum value preferably dynamically selected in dependence on the PWM threshold (e.g. as described previously). The calculating step may comprise scaling the integrator value by a second value, the second value preferably being selected in dependence on (and preferably being proportional to) the target temperature. The second value may also be dependent on (preferably inversely proportional to) a reference temperature value. The second value may alternatively or additionally be dependent on an outside temperature (exterior to a building whose environment is being temperature controlled) for example by being determined in dependence on a difference between a current temperature of the environment and the outside temperature.

Receiving a current temperature value determined based on a measurement of a current temperature in the environment may comprise receiving one or more temperature measurements, and pre-processing the temperature measurement(s) to generate the current temperature value. For example, pre-processing the temperature measurement(s) may comprise filtering the temperature measurements and/ or may comprise generating a delay-compensated temperature value. The method may comprise pre-processing the temperature measurement(s) to compensate for lag within the temperature control system, to thereby produce a temperature signal which leads an actual measured signal. These features may also be provided independently.

Accordingly, in a further aspect of the invention (as set out in claim 35), there is provided a method of generating a control signal for a temperature control system, comprising: receiving a series of temperature measurements from a temperature sensor; processing the temperature measurements to compensate for lag associated with the temperature control system, the processing comprising generating a series of delay-compensated temperature values based on the temperature measurements; and generating the control signal based on the delay-compensated temperature values.

The processing step may comprise applying a lead compensator to the measured temperature values, the lead compensator preferably configured according to an estimate of system delay associated with the temperature control system. The processing step may comprise applying a filter function to the temperature measurements, the filter function preferably calculating a weighted sum of a current measured temperature value and at least one previous measured temperature value (e.g. a (immediately) preceding temperature value), the contributions optionally weighted in dependence on one or more of: a sampling interval and a delay time constant. The method may comprise calculating a current delay-compensated temperature value by subtracting a preceding delay-compensated temperature value from the weighted sum.

The generating step may comprise providing the delay-compensated temperature value as input to a temperature control algorithm, such as a time-proportional-integral (TPI) control algorithm (or any other proportional-integral-derivative (PID) type control system) and/or to a rate estimator for estimating a rate of temperature change in an environment, preferably as described elsewhere herein. The generating step may comprise performing a method as set out in any of the previously or subsequently defined aspects of the invention.

In a further aspect of the invention (as set out in claim 41), there is provided a method of generating a control signal for a temperature control system, comprising: receiving control schedule information specifying a target temperature and a start time for a period during which temperature control is to be performed based on the target temperature; during a control process operating at a time prior to the start time, repeatedly performing the steps of: determining a rate of change of a temperature in an environment; determining, based on the determined rate of change, an estimate of a time required by the temperature control system to attain the target temperature; and generating the control signal in dependence on the determined estimate.

Thus the rate of change (referred to as ramp rate below) is preferably repeatedly or periodically calculated, with the time estimation dynamically influenced by the rate calculation (by using a currently applicable value for the rate, e.g. the most recently calculated value). The rate calculation may be performed as set out in relation to the previously defined aspects of the invention.

The generating step may comprise generating the control signal to activate the temperature control system in accordance with the target temperature at a time earlier than the start time. Thus, the temperature control system may be activated in advance of the scheduled time so that the target temperature is achieved closer to the schedule time, allowing for the expected responsiveness of the system in controlling the environmental temperature.

The period is preferably a next time period defined in the schedule after the current time, the method preferably comprising setting a target temperature for a current time period to the target temperature defined for the next time period. In other words, the next target temperature may be selected in advance of the scheduled time.

The method may comprises generating the control signal to activate the temperature control system prior to the start time in response to determining at least one of: a remaining time until the start time not being greater than the estimated time; a remaining time until the start time not being greater than a maximum time (which may be configurable). If one or preferably both criteria are not met, no advance activation preferably occurs.

The estimate of the time may be scaled based on a configurable modifier.

The control signal may be generated using a method as set out in any of the previously defined aspects of the invention.

In any of the described aspects, the method may include outputting the control signal to the temperature control system, the temperature control system preferably performing environmental temperature control based on the control signal (e.g. by activating/deactivating a boiler or other temperature control device). The temperature control system may comprise an environmental heating system (which may be or include a central heating boiler, to which the control signal is supplied). Such an environmental heating system preferably performs environmental heating (in an environment within a building such as a residential dwelling) to attain a configured target temperature, using the described control processes. A target temperature may also be referred to as a set point.

The invention further provides a system or apparatus, e.g. in the form of a control module having a processor or a control circuit, the system or apparatus having means for (or being adapted for) performing any method as set out herein (including in the above-defined aspects of the invention). Such a system/apparatus may comprise a processor with associated memory configured for performing any of the methods disclosed herein e.g. by way of software code stored in the memory.

The invention further provides a (tangible, non-transitory) computer readable medium or computer program product comprising software code adapted, when executed on a data processing apparatus, to perform any method as set out herein.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus and computer program aspects, and vice versa.

Furthermore, features implemented in hardware may generally be implemented in software, and vice versa. Any reference to software and hardware features herein should be construed accordingly.

BRIEF DESCRIPTION OF THE DRAWINGS

Preferred features of the present invention will now be described, purely by way of example, with reference to the accompanying drawings, in which:—

DETAILED DESCRIPTION

Embodiments of the invention provide a system and associated control algorithms for controlling a domestic heating system.

Figure 1:
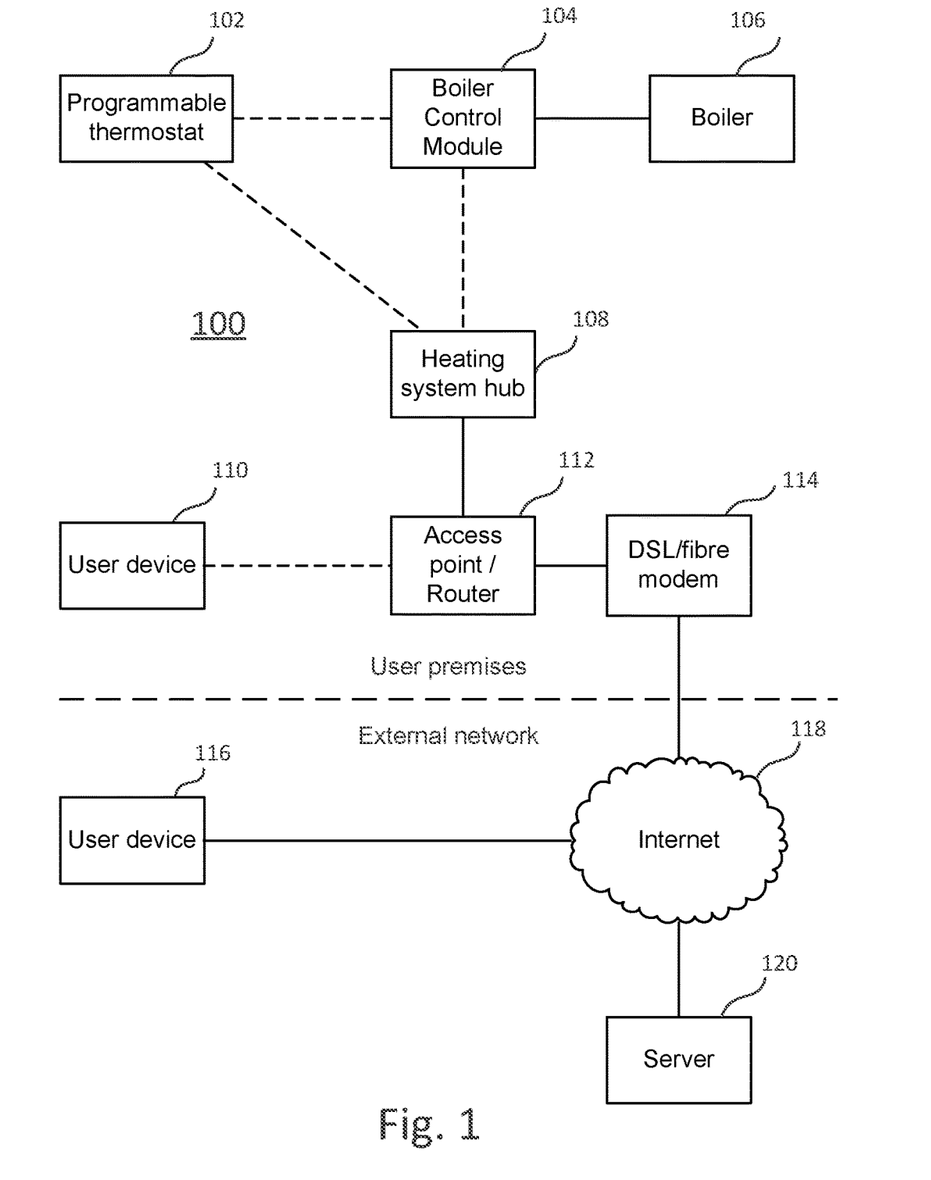
FIG. 1 illustrates a domestic heating system.

FIG. 1 illustrates components of an example domestic heating system in which the invention may be applied. The heating system 100 includes a programmable thermostat 102 which connects wirelessly to a boiler control module 104. The boiler control module is connected by a wired connection to central heating/hot water boiler 106. The boiler may, for example, be a conventional gas boiler arranged to provide a supply of heated water to a series of radiators in the user's home and to a hot water tank for onward supply to hot water taps.

The thermostat 102 and boiler control module 104 are further connected wirelessly to a heating system hub 108.

The hub 108 is connected to the user's home network and/or internet access infrastructure. For example, in a typical configuration the heating system hub 108 is connected via a wired connection to a wireless or wired home router/access point 112, which in turn provides access to the Internet through a modem 114, such as an ADSL or fibre modem. Depending on access technology, router 112 and modem 114 may be combined in a single device or replaced with other access devices appropriate to the access technology.

The heating system hub 108 thus acts as a gateway between the heating system 100 and other local network devices (e.g. a user device 110) as well as the external network. The thermostat 102, boiler control module 104 and hub 108 are preferably connected in a mesh configuration, so that communication between thermostat and receiver may be direct or via the hub.

The thermostat 102 measures ambient temperature using a temperature sensor and sends temperature information to the boiler control module 104.

The boiler control module 104 stores programmed schedules and controls the boiler to switch environmental heating and hot water on and off based on schedules and direct control information received via the thermostat 102, other user devices 110/116 and/or remote server 120.

In one example, a user may program a daily heating schedule at wireless thermostat 102, and the thermostat sends the schedule to the boiler control module 104. The boiler control module then uses the schedule together with temperature measurements received from the thermostat to turn the boiler on or off as needed to attain a target temperature specified in the schedule. Instead of scheduled operation, the boiler may also be controlled based on manual settings (e.g. a manual target temperature). The target temperature may also be referred to herein as the "set point". While in this example, the above control functions are performed by a standalone controller device, they could alternatively be integrated into the thermostat, the boiler, or any other suitable device.

The user may additionally interact with the system from a separate user device 110 connected to the local network or from a user device 116 located outside the user's home and connected to the Internet 118. User devices 110 and 116 may take the form of smartphones, tablet computers, personal computers, and the like. User devices may include an application for controlling the heating system, for example to create or edit a heating/hot water schedule, switch between manual/scheduled operation, adjust temperature, activate boost mode, etc. The application may then send information to the wireless thermostat 102, to the boiler control module 104 or the hub 110 as required (e.g. to update a schedule).

A control interface may also be provided through a remote server 120. This may be a web interface accessible by user devices 110, 116, to perform the operations discussed above, e.g. setting a schedule. The server then transmits control information (e.g. a modified schedule) to the heating system 100 (e.g. to the boiler control module 104).

While the above example describes a networked control system (including networked thermostat and boiler control module), the described control methods are equally applicable to other types of heating system (including those lacking network features).

Figure 2:
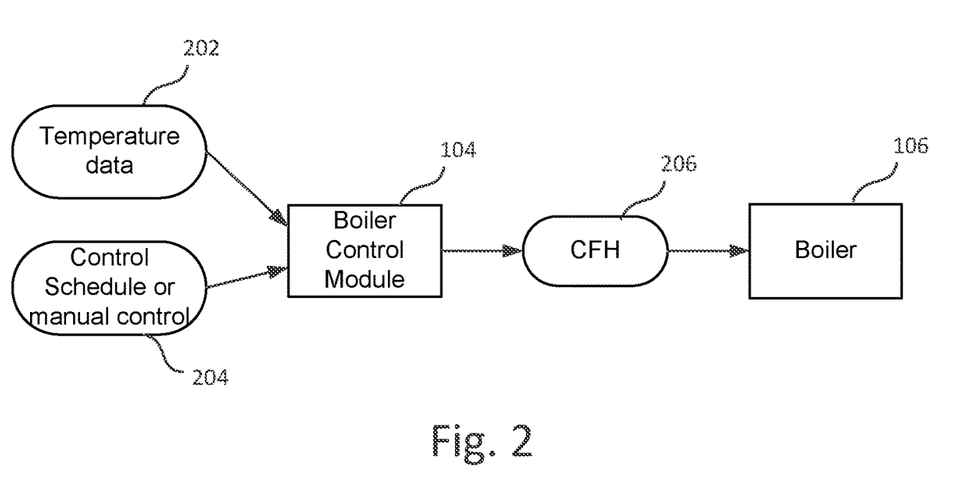
FIG. 2 illustrates control of a boiler by a boiler control module.

Operation of the boiler control module is illustrated further in FIG. 2. The boiler control module 104 receives temperature measurement data 202 from the thermostat 102 and optionally pre-processes the measurements to provide a temperature signal indicative of the current ambient temperature in the environment in which the thermostat is situated.

Additionally, the receiver/controller receives control information 204, from the thermostat, or from some other device e.g. via the system hub 108 from the internal or external network. The control information may provide a control schedule defining target temperatures for one or more time periods during the day. An example of a control schedule is set out below in Table 1:

TABLE 1

| Start time | End Time | On/Off | Target Temperature |
|---|---|---|---|
| 00:00 | 07:00 | Off | — |
| 07:00 | 10:00 | On | 18° C. |
| 10:00 | 17:00 | Off | — |
| 17:00 | 22:00 | On | 20° C. |
| 22:00 | 00:00 | Off | — |

In scheduled mode of operation, the receiver/controller controls the boiler 106 based on the schedule, by heating the environment to the target temperature set for an "ON" time period during that time period. During an "OFF" period no heating is performed (except that heating may still be performed during an OFF period to prevent damage to pipework and devices if the temperature falls below a frost protection threshold, e.g. 5° C.).

In a manual mode, a target temperature may be set directly (without being linked to a particular time period) and the system heats the environment to that temperature until the heating is manually deactivated, the target temperature is changed, or scheduled mode is activated.

In either case, while in the active state, the receiver/controller controls operation of the boiler by switching the boiler on or off as needed to achieve (approximately) the desired target temperature.

Control of the boiler is via a call-for-heat (CFH) signal 206. In typical embodiments, the CFH signal has two states: when in the ON or HIGH state, the boiler turns on to heat water which is supplied to radiators in the building. When in the OFF or LOW state, the boiler is off and no hot water is supplied. In such a system, a desired temperature is achieved by alternating the CFH signal between ON and OFF states as needed.

However, whilst described principally in relation to a binary CFH signal, the disclosed methods may be adapted for use with other forms of control signal.

The control process used by the boiler control module is based on a Time Proportional Integral (TPI) control strategy. TPI control provides a means of reducing temperature overshoot in properties which have high rates of temperature increase when the boiler is on (called the 'ramp rate'). It can be used with boilers that have on/off control inputs to reduce their average output (and hence the average outlet temperature) as the room temperature approaches the target level. This is done by applying a form of Pulse Width Modulation (PWM) to the CFH signal that is fed to the boiler, varying the ON interval within a fixed modulation period the modulation period is typically around 10-15 minutes. The PWM mode becomes active when the temperature is within a predefined threshold of the target (the signal is ON continuously below that threshold), with the ON ratio reducing as the temperature error reduces. The integral element of the TPI control compensates for the property's heat loss, ensuring that the PWM ratio is greater than zero when the temperature error is zero to prevent a steady state error in the temperature achieved.

Figure 3:
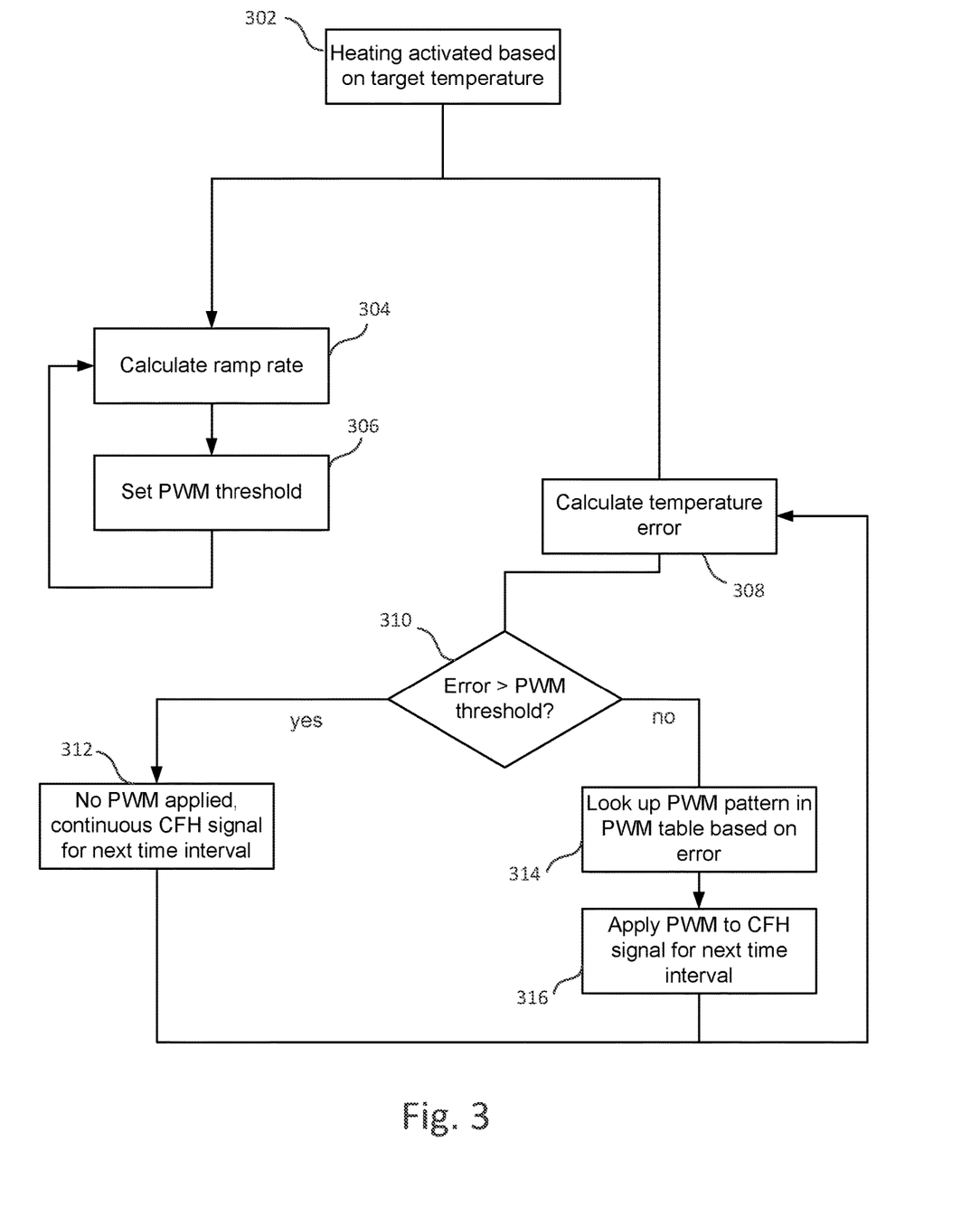
FIG. 3 illustrates generation of a Call-for-Heat (CFH) signal.

The control process is illustrated in overview in FIG. 3.

In step 302, the heating is activated based on a configured target temperature. This may be because of a programmed schedule or because heating has been activated manually. In this example, it is assumed that the required target temperature is substantially higher than the actual measured temperature at this point in time, so that heating is required.

After activation of the heating system, two processes are carried out continuously and in parallel. In the first, a ramp rate is calculated (step 304), which corresponds to the rate of change of the measured temperature in the environment. A PWM threshold is then set based on the ramp rate in step 306. Steps 304 and 306 are repeated periodically, at a predetermined rate.

In the second of the parallel processes, heating is controlled based on the measured temperature and the configured PWM threshold.

Specifically, in step 308, the temperature error is determined based on the difference between the ambient temperature measured at the thermostat, and the target temperature, as described in more detail below.

In step 310, it is determined whether the error exceeds the PWM threshold (set in parallel process 304-306). If so, this means that the measured temperature is still a relatively long way off the desired target temperature. For the duration of the next time interval, a continuous "ON" CFH signal is thus output to the boiler without applying PWM (step 312).

On the other hand, if the error is below the PWM threshold, then the measured temperature is (relatively) close to (approaching) the target temperature. In this case, PWM is applied to the CFH signal to prevent or reduce overshoot. To this end, in step 314, the system looks up a PWM pattern in a PWM table based on the temperature error. In step 316, a pulse-width modulated CFH signal is output to the boiler for the duration of the next time interval as specified in the PWM table. Steps 308, 310, 312, 314 and 316 are repeated periodically, at a predetermined error sampling rate.

Figure 4:
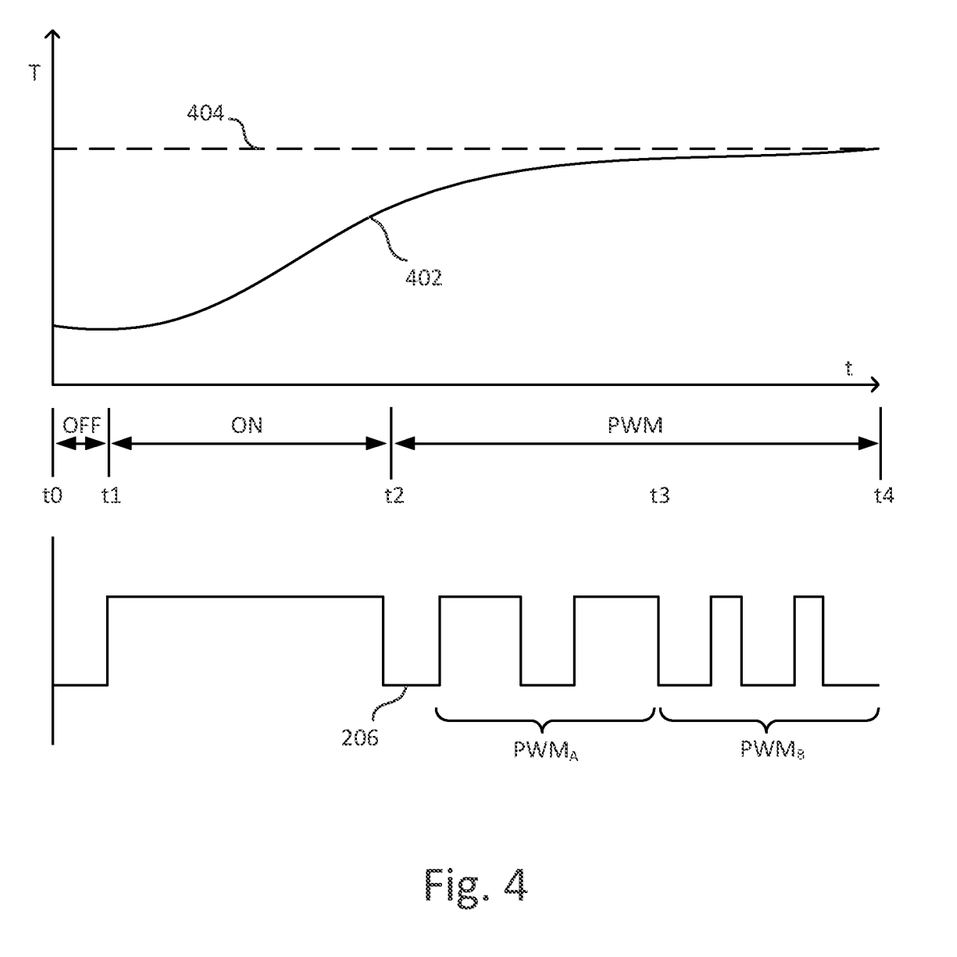
FIG. 4 depicts a temperature curve and an associated CFH signal.

FIG. 4 illustrates an example of a heating cycle. The upper graph depicts a measured temperature curve 402 plotted against time, as well as a target temperature 404. The lower graph illustrates the CFH signal 206.

Initially, from time t0 to t1, the heating is off, and thus the CFH signal is in the OFF state. At time t1, the heating is activated, e.g. manually or based on a schedule. The temperature error is determined. In this example, the temperature error at this point exceeds the PWM threshold, and therefore no PWM is applied at this stage. Instead, the controller operates in continuous mode to output a continuous "ON" CFH signal to the boiler.

During time period t1 to t2, the temperature in the environment rises as a result of the heat output of the heating system. In this example, at time t2, the temperature error falls below the PWM threshold. During time period t2 to t4, as the measured temperature 402 approaches the target temperature 404, the CFH signal is therefore pulse-width modulated, which reduces the amount of time the boiler is actually turned on and thus reduces the heat output. Reducing the average heat output on approach to the target temperature in this way prevents (or at least reduces) overshooting the target temperature.

The pulse width pattern used to generate the pulse-width modulated CFH signal is obtained from the PWM table based on the temperature error. During a first PWM phase (t2 to t3), a first PWM pattern $PWM_A$ is applied to the CFH signal, so that the CFH signal is mostly "on" (high ON-to-OFF ratio), whereas during a second PWM phase (t3 to t4) a second PWM pattern is applied to the CFH signal so that the CFH signal is mostly "off" (low ON-to-OFF ratio).

It should be noted that FIG. 4 is a simplified example for purposes of illustration, and the actual PWM patterns applied may differ and may be more complex.

As discussed in relation to FIG. 3, during the depicted process, the PWM threshold is continuously recalculated based on the measured ramp rate, and when determining whether the temperature error is within the PWM threshold, the most recent calculated PWM threshold is used.

The following sections describe different elements of the control algorithm in more detail.

Temperature Measurement

The boiler control module receives regular temperature measurements from the thermostat.

Figure 5:
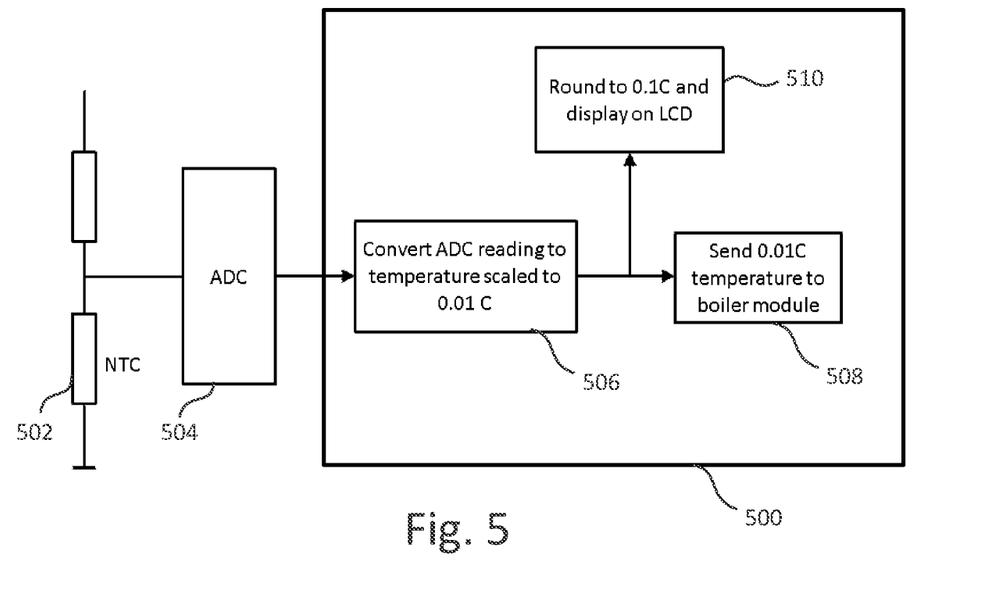
FIG. 5 illustrates temperature measurement at a thermostat.

Temperature measurement is illustrated in FIG. 5. As shown, the ambient temperature is measured at the thermostat by way of a negative temperature coefficient thermistor 502, the output of which is converted to a digital value by an analogue-to-digital convertor 504. Other types of temperature sensors may alternatively be used, such as a PTC (positive temperature coefficient) sensor or integrated temperature sensor IC.

A processor (or other controller) 500 of the thermostat converts the ADC reading to a temperature value scaled in 0.01° C. increments (506), though any appropriate temperature resolution may be used depending on particular accuracy requirements. The resulting value is sent to the boiler control module (508) via the wireless network connection. Additionally the processor may process the temperature value for local display at the thermostat (e.g. by rounding, 510). Output of temperature data to the boiler control module may occur at a fixed or configurable sampling rate.

In this example, the temperature measurements received at the boiler control module are thus expressed as integer values representing multiples of the minimum temperature increment (in this example 0.01° C.). This allows for more efficient storage and computation (compared to e.g. a floating-point representation). However, alternative representations, including floating-point, could be used.

The temperature measurement data is received, stored and processed at the boiler control module. Processing at the boiler control module may occur at the thermostat sampling/output rate or at a different sampling rate. The control module may retain a history of temperature samples for use in calculations as well as for reporting and other purposes.

Ramp Rate

The boiler control module periodically calculates the heating 'ramp rate' (the rate at which temperature in the vicinity of the thermostat increases) while the boiler is on.

The calculation is performed based on a series of temperature samples, and can be by various means, including differentiating filters and least squares line fit or other curve fitting algorithms to a series of temperature samples over the calculation interval. Additional low pass filtering of the calculated values can be performed, since differentiation is inherently noise amplifying.

In a preferred embodiment, the ramp rate is only calculated after the boiler has been continuously on for a defined interval (30 minutes in an example implementation) and is calculated over a shorter final part of that interval (the last 14 minutes in an example implementation) and updated periodically while the boiler remains on (every 2 minutes in an example implementation). The initial (30 minute) interval is to ensure that calculation of heating rate does not commence until the transient effects of turning the boiler on have decayed and the system is up to normal operating flow temperatures.

In a preferred implementation, the boiler control module thus stores a history of a past temperature measurements, from which the ramp rate is estimated by line fitting (using a predetermined number of the most recent temperature samples).

Setting the PWM Threshold

The ramp rate is used to adapt the threshold at which PWM control begins. The PWM threshold is preferably proportional to the ramp rate such that a larger lamp rate corresponds to a larger threshold.

In a preferred embodiment, below a predefined ramp rate the PWM threshold is reduced to zero so that PWM is not performed (regardless of the temperature error) and the control algorithm reverts to simple on/off control. This can ensure that dynamic performance is not compromised in properties which have low ramp rates. Alternatively a different minimum PWM threshold could be set. Furthermore, above a maximum ramp rate, a predefined maximum PWM threshold may be applied.

Error Measurement

The error is calculated at a predetermined error sampling interval (which may be the same as or different from the temperature sampling interval) based on the difference between target temperature and measured temperature:

$$\Delta(t) = \text{Target} - \text{Temp}(t)$$

An error measure e(t) is then calculated based on the temperature delta using an algorithm based on TPI principles. The basic TPI formula typically has the form $$e(t) = k_1 \times \Delta(t) + k_2 \sum_{i=0}^{i=t} \Delta(t)$$

Where $k_1$ and $k_2$ are respective weights for the proportional and integral terms (note that a differential term could in principle also be added but is not used in the embodiment).

In a preferred approach, $k_1=1$ and $k_2$ is selected in dependence on the target temperature. Specifically, the integral contribution is scaled by a value proportional to the target temperature. This reduces the variation in the integral component as the target varies. Furthermore, the integrator is only updated when the system has been within the PWM threshold of the target for a defined period (one hour in an example implementation) and the target has remained constant. This ensures the system is in a quasi steady state and the integrator is adapting to counter the steady state heat losses and not the transient effects of raising the temperature to meet the target. The integral contribution is limited according to the threshold within which PWM is applied, meaning there is an adaptive integrator wind-up limit.

In a specific example, the integral contribution is scaled by a fixed integral gain factor $k_i$ and by the ratio between target temperature and a selected reference temperature, as follows:

$$e(t) = \Delta(t) + k_i \times \frac{\text{Target}}{\text{Ref}} \times \text{Int}(t)$$

Here, Int(t) represents the integral term which is calculated as set out below.

The scaling by the target-reference ratio varies the contribution of the integral term as the temperature difference between the interior and exterior of the property changes. A fixed reference is chosen empirically on the assumption that the exterior temperature is generally not available to the system. The fixed reference provides a nominal target temperature so that adjustments are scaled according to the actual target versus the nominal target.

In cases where the exterior temperature is known, the actual temperature delta can be utilised in the calculation. Specifically, the integral contribution could then be scaled based on the difference between target and outside temperatures without using a nominal reference. Use of the nominal reference as set out above is essentially equivalent to assuming an outside temperature of zero (this may result in under-estimating the amount the integral contribution should increase when the target temperature is raised but that may be preferable in terms of reducing overshoot compared to overestimation).

The values $k_i$ and Ref may further be chosen to allow efficient computation by selecting the values such that the $$\frac{k_i}{\text{Ref}}$$

factor can be implemented as a bit shift operation.

The Int(t) integrator term is calculated by adding the current temperature error to the sum of previous errors, with the following exceptions:
- If the target temperature has been reduced since the last measurement interval, then the integrator is not incremented until the measured temperature has fallen below the new target temperature
- If the target temperature has been raised since the last measurement point, then integrator updates are not performed until a predetermined time period (here one hour) after the measured temperature gets to within a threshold distance of the target temperature; where the threshold distance is preferably the same as the PWM threshold.

In the above cases, the integrator is not updated. Otherwise, the difference between target and measured temperature is added to an accumulator:

$$\text{Int} := \text{Int} + (\text{Target} - \text{actual})$$

The integrator value is further limited to a predetermined range; if it falls below zero it is set to zero, and if it exceeds a predetermined threshold it is set to that threshold (here the threshold is set at PWM_threshold/$k_i$).

Alternative strategies could be used to decide which measurements are added to the integrator and how to limit allowed values of the integrator. These criteria may be selected based on empirical performance characteristics and requirements of specific application contexts.

PWM Lookup

For ramp rates above the minimum defined ramp rate, the PWM ratios to apply at any given temperature error are held in a table which is split into segments across the PWM period (2 minute segments in an example implementation). This ensures the interval between boiler on or off requests is never less than the segment time, as changing between on/off at a short interval can be detrimental to boiler performance.

Furthermore, the algorithm preferably allows a minimum boiler off time to be specified (in an example implementation this is 6 minutes). Thus, after the target has been reached and the CFH signal changes from the PWM signal to continuous "OFF", it will remain in the OFF state for at least the minimum OFF time, even if the measured temperature falls below the threshold before the end of the minimum OFF time.

Figure 6A:
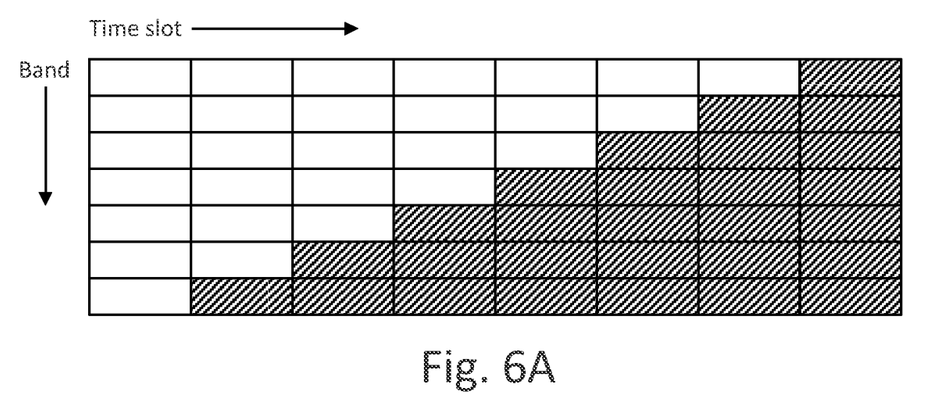
FIGS. 6A and 6B illustrate pulse-width modulation patterns for generating CFH signals.

An example of the PWM table is illustrated in FIG. 6A. Each row of the table represents a particular PWM pattern, dividing the PWM period into eight segments, each of which may be an "off" or "false" segment (empty cells) or an "on" or "true" segment (shaded cells). Assuming a two minute segment duration each pattern thus represents a 16-minute PWM period.

Each row or pattern is associated with a particular band of the range of possible error values within the range in which PWM is applied (0<e(t)≤PWM_threshold). The duration of each PWM time segment preferably corresponds to the temperature and/or error sampling interval.

Figure 6B:
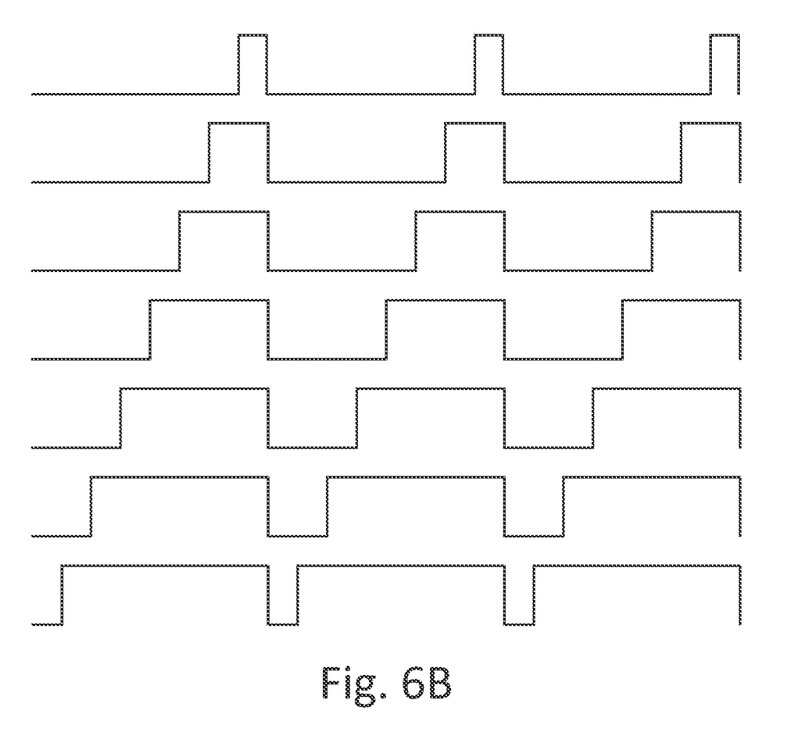

Example PWM waveforms corresponding to the PWM patterns of the table are illustrated in FIG. 6B.

Alternatively, the PWM patterns could be dynamically generated, for example based on ratios indicating the OFF-to-ON ratio to be applied in a PWM period. The ratios themselves could be predefined or could themselves be calculated, e.g. from the error measure.

Applying PWM

As described above, as soon as the temperature error falls below the PWM threshold, the CFH signal is modulated using the PWM ratio defined in the PWM table.

Figure 7:
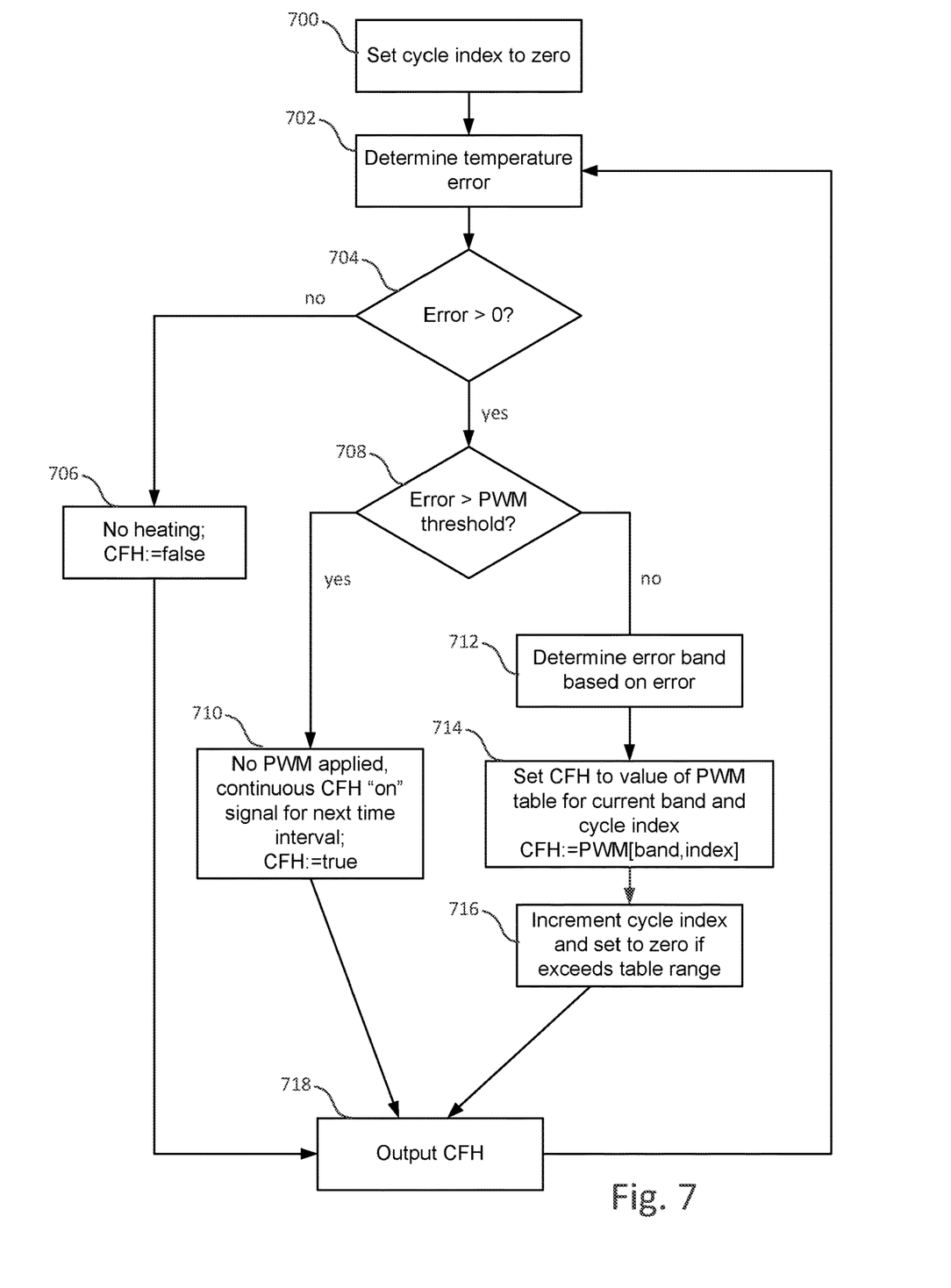
FIG. 7 illustrates the CFH signal generation process in more detail.

The process of applying PWM is illustrated in more detail in FIG. 7 and is repeated for each error update interval.

In step 700, a cycle index variable is set to zero. The cycle index variable is used to cycle through entries in rows of the PWM table.

In step 702, the temperature error is obtained based on the TPI calculation described above. In step 704, the system determines whether the error is less than or equal to zero (or other appropriate threshold) indicating that the target temperature has been attained (or at least that the measured temperature is sufficiently close to the target temperature), in which case no heating is performed (the call for heat signal is set to OFF or false, step 706).

Otherwise, the system determines whether the error exceeds the PWM threshold. This means that the temperature is still relatively far from the target temperature, and therefore the CFH signal is set to "ON" or true to provide continuous heating (step 710).

If the error does not exceed the PWM threshold, then the CFH signal is modified based on the PWM table. In that case the system determines the error band in step 712. Preferably, the range of possible error values between zero and the PWM error threshold is divided substantially equally into bands. For example, the band may be calculated as the rounded or truncated value of:

$$PWMrows \times \frac{e(t)}{PWMthreshold}$$

(where PWMrows is the number of rows or patterns in the PWM table.)

In step 714, the CFH signal is then set to the value indicated in the PWM table for the identified band and the current cycle index (either "true"/ON or "false"/OFF). The cycle index is then incremented, wrapping to zero, in step 716.

In step 718, the CFH signal is output to the boiler to activate the boiler (CFH=true) or deactivate the boiler (CFH=false).

As illustrated in FIG. 6A, the PWM patterns in the PWM table begin with OFF periods, to ensure that the ramp rate is reduced as soon as the PWM threshold is reached.

After the measured temperature exceeds the target, indexing of the PWM table is reversed. While the temperature remains above target, no heating is performed, but as soon the temperature falls below the target again, PWM is applied to the CFH generation as per the process in FIG. 7. However, because the relevant PWM row is now accessed in reverse order, ON periods are encountered first. This reduces undershoot when the temperature drops below the target.

Delay Compensation

In some embodiments, the temperature reading may be pre-processed to compensate for lags within the overall heating system. This delay-compensated temperature value is then used within the TPI algorithm in place of the raw reading from the temperature sensor. This produces a temperature signal which leads the measured value and so reduces temperature overshoot. The amount of delay compensation is adjustable to accommodate different heating system and temperature sensor delay characteristics.

The delay compensation may be implemented as a lead compensator configured according to an estimate of system delay that is entered as an algorithm parameter (based on the underlying assumption that the system delay can be reasonably approximated as a first order lag).

In one example, a compensated temperature value is calculated as $$\text{Comp}(t) = \left(1 + \frac{2\tau}{T}\right) \times \text{Temp}(t) + \left(1 - \frac{2\tau}{T}\right) \times \text{Temp}(t-1) - \text{Comp}(t-1)$$

Where:
Comp(t) is the calculated compensated temperature value at time t
Temp(t) is the actual measured temperature value at time t
τ is a delay time constant
T is the update (sampling) interval The compensated value calculated as set out above may additionally be filtered (in one example to add back some lag at high frequency to stabilise the system) to produce a final filtered delay-compensated temperature value, which is then provided as the temperature input to the other system components and processes, including the previously described TPI control algorithm and the ramp rate calculation.

Optimum Start

The algorithm includes an 'Optimum Start' capability, in which the system calculates the time required to increase temperature from its current value to the schedule target value and uses that to turn the boiler on earlier than the time at which the schedule target changes to ensure the room temperature is at or close to the target at the scheduled time. For example, if the target changes to 22° C. at 16:00, it is 20° C. in the house and the rate estimate is 1° C./hour the thermostat would start using the 22° C. target 2 hours early at 14:00, so that the target should be reached by 16:00.

The Optimum Start function uses the ramp rate calculated as described previously. Since the ramp rate is continually recalculated the optimum start calculation takes account of the recent measured heating performance of the system, allowing it to adapt to the influence of changes in outside temperature (for example) to achieve the desired temperature schedule.

In a preferred implementation, if enabled, the optimum start algorithm calculates the time it would take to achieve the next target temperature specified in the schedule, based on the current measured temperature and the dynamically determined ramp rate. If that time is greater than the time until the start of the next scheduled period, and the start of the next scheduled period is within a predetermined maximum time, then the currently applicable target temperature is replaced by the target temperature for the next scheduled period. The maximum time ensures that early activation of the heating only occurs in advance of the scheduled period by that maximum (e.g. to avoid excessive divergence from the target set for the current period). If the time taken to achieve the next target temperature is less than the remaining time until the start of the next scheduled period it is not yet necessary to turn the heating on and so early activation is not (yet) performed.

System attributes can preferably be used to turn optimum start on or off, to set the maximum advance allowed within a predefined range and at a specified time resolution (in one example a 1 minute resolution and a range of 0 to 180 minutes is provided). An advance factor percentage may also be set (default is 100%) which is used to scale the calculated time value for achieving the next target temperature, to provide additional time to reach the target.

Hardware Architecture

Figure 8:
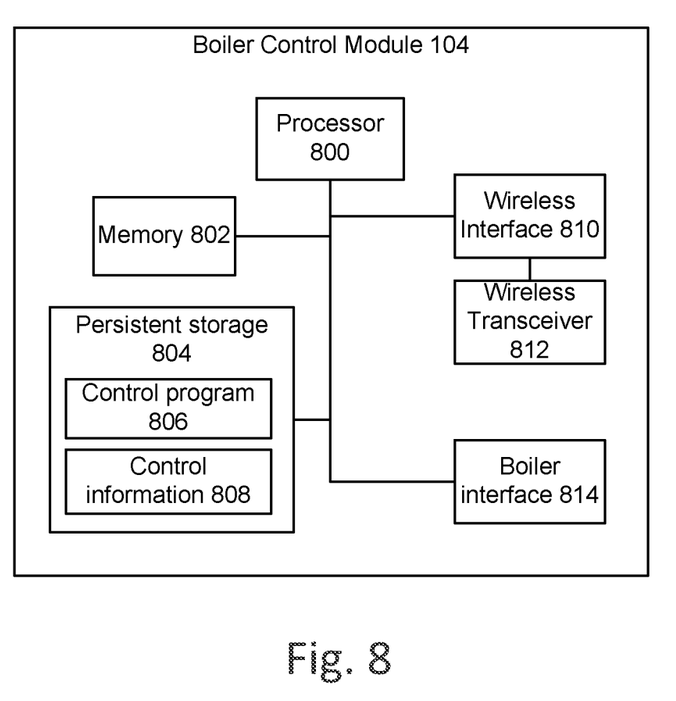
FIG. 8 illustrates a boiler control module adapted to perform the CFH signal generation.

FIG. 8 illustrates a hardware architecture of the boiler control module 104.

The control module includes a processor 800 together with volatile/random access memory 802 for storing temporary data and software code being executed. Persistent storage 804 (e.g. in the form of FLASH memory) persistently stores a control program 806 which is arranged to received the temperature data from the thermostat and carry out the TPI and other algorithms described above. Persistent storage 804 may further store control information 808, including the control schedule(s) programmed by the user, past temperature data, configuration parameters, and the like.

Persistent storage may include other software and data, such as an operating system and device driver software.

Communication with the thermostat and other networked components occurs via a wireless network interface 810 and wireless transceiver 812. The CFH signal generated by control program 802 is output to the boiler via a boiler interface 814.

The device components are interconnected by a data bus (this may in practice consist of several distinct buses such as a memory bus and I/O bus).

While a specific architecture is shown, any appropriate hardware/software architecture may be employed. For example, external communication may be via a wired network connection, or the CFH signal could be output wirelessly.

It will be understood that the present invention has been described above purely by way of example, and modification of detail can be made within the scope of the invention.

For example, while described in relation to a heating system, the described control processes could be applied to other temperature control systems. For example, the described processes could be applied to cooling systems such as air conditioners or refrigerators, or to other systems using a binary control input to control activation/deactivation of the system. In a cooling system example, the described approach could be used by applying PWM to an output signal as the measured temperature falls from a higher measured temperature towards a lower target temperature. Thus, the temperature curve and applicable thresholds would be inverted, but the principles underlying the control scheme would be the same.

The invention claimed is:

1. A method of generating a control signal for a temperature control system, the control signal having one of an "on" state in which the temperature control system is to be activated and an "off" state in which the temperature control system is to be deactivated, the method comprising:
   receiving an indication of a target temperature for a temperature-controlled environment;
   receiving a current temperature value determined based on a measurement of a current temperature in the environment;
   calculating a temperature error measure in dependence on the target temperature and the current temperature value;
   determining a rate of temperature change in the environment;
   setting a variable error threshold based on the determined rate of temperature change;
   generating the control signal, wherein the generated control signal comprises, in a first, continuous mode, a substantially continuous "on" signal, and wherein, in a second, pulse-width-modulation (PWM) mode, the output signal comprises alternating "off" and "on" periods in accordance with a PWM pattern; and
   switching between the first mode and second mode in dependence on the temperature error measure and the variable error threshold.

2. A method according to claim 1, comprising generating the control signal in the continuous mode if the temperature error measure exceeds the error threshold and/or generating the control signal in the PWM mode if the temperature error measure is below the error threshold.

3. A method according to claim 1, comprising generating the control signal in accordance with the first or second mode in response to determining that temperature control is required.

4. A method according to claim 3, comprising determining whether to perform temperature control based on the temperature error measure.

5. A method according to claim 1, comprising performing the rate determining and threshold setting steps periodically during operation to generate the control signal.

6. A method according to claim 1, wherein the determining and setting steps are performed after the temperature control system has been continuously activated for a predetermined period of time.

7. A method according to claim 1, comprising, when the determined rate of temperature change is less than a predetermined value, setting the variable error threshold to a predetermined value.

8. A method according to claim 1, comprising selecting a PWM pattern from a plurality of predefined PWM patterns in dependence on the calculated temperature error measure, each pattern defining a sequence of pattern segments for a control signal, each segment corresponding to an "on" signal state or an "off" signal state; and generating the control signal based on the selected PWM pattern.

9. A method according to claim 8, wherein each pattern segment corresponds to a predetermined signal duration, and the generating step comprises generating, for each segment of the selected pattern, an "on" or "off" output signal as specified by the PWM pattern for the segment, for the segment duration.

10. A method according to claim 8, wherein generating the control signal based on the selected PWM pattern comprises repeatedly generating a signal with the specified pattern.

11. A method according to claim 8, wherein the selecting and generating steps are performed when the temperature error measure meets one or more predetermined criteria for generating the output signal in a PWM mode; and wherein the predetermined criteria comprise one or both of:
the temperature error measure meeting or exceeding a predefined minimum error, optionally zero;
the temperature error measure not exceeding or being below a predefined maximum error for PWM operation.

12. A method according to claim 8, wherein the generating comprises applying the pattern in a first sequence order if the current measured temperature value is approaching the target temperature, wherein the first segment of the PWM pattern is defined as an "off" segment in the first sequence order, and wherein the generating comprises applying the pattern in a second sequence order when returning to PWM signal generation after overshooting the target temperature.

13. A method according to claim 1, wherein calculating a temperature error measure comprises determining a current temperature difference between the target temperature and the current temperature value, the temperature error measure being based on the current temperature difference.

14. A method according to claim 13, wherein calculating the temperature error measure comprises adding a contribution based on the current temperature difference and a contribution based on an integrator term, the integrator term based on a sum of past temperature differences, and wherein the calculating step comprises adding the current temperature difference to the integrator term only if one or more predetermined update criteria are met.

15. A method according to claim 14, comprising one or more of: updating the integrator if the temperature error is below a predetermined threshold, the predetermined threshold;
not updating the integrator if the target temperature has been reduced and the measured temperature has not yet fallen below the reduced target temperature; and
only updating the integrator after the temperature error measure has been within a predetermined threshold for a predetermined duration.

16. A method according to claim 14, comprising limiting the integrator value to a maximum value.

17. A method according to claim 14, wherein the calculating comprises scaling the integrator value by a second value.

18. A method according to claim 1, wherein receiving a current temperature value determined based on a measurement of a current temperature in the environment comprises:
receiving one or more temperature measurements; and
pre-processing the temperature measurement(s) to generate the current temperature value;
wherein pre-processing the temperature measurement(s) comprises one or both of:
filtering the temperature measurements; and
generating a delay-compensated temperature value.

19. Apparatus for generating a control signal for a temperature control system, the control signal having one of an "on" state in which the temperature control system is to be activated and an "off" state in which the temperature control system is to be deactivated, the apparatus comprising a control module configured to:
receive an indication of a target temperature for a temperature-controlled environment;
receive a current temperature value determined based on a measurement of a current temperature in the environment;
calculate a temperature error measure in dependence on the target temperature and the current temperature value;
determine a rate of temperature change in the environment;
set a variable error threshold based on the determined rate of temperature change;
generate the control signal, wherein the generated control signal comprises, in a first, continuous mode, a substantially continuous "on" signal, and wherein, in a second, pulse-width-modulation (PWM) mode, the output signal comprises alternating "off" and "on" periods in accordance with a PWM pattern; and
switch between the first mode and second mode in dependence on the temperature error measure and the variable error threshold.

20. A non-transient, computer readable medium comprising software code adapted, when executed on a data processing apparatus, to perform the method of generating a control signal for a temperature control system, the control signal having one of an "on" state in which the temperature control system is to be activated and an "off" state in which the temperature control system is to be deactivated, the method comprising:
receiving an indication of a target temperature for a temperature-controlled environment;
receiving a current temperature value determined based on a measurement of a current temperature in the environment;
calculating a temperature error measure in dependence on the target temperature and the current temperature value;
determining a rate of temperature change in the environment;
setting a variable error threshold based on the determined rate of temperature change;
generating the control signal, wherein the generated control signal comprises, in a first, continuous mode, a substantially continuous "on" signal, and wherein, in a second, pulse-width-modulation (PWM) mode, the output signal comprises alternating "off" and "on" periods in accordance with a PWM pattern; and
switching between the first mode and second mode in dependence on the temperature error measure and the variable error threshold.

* * * * *